United States Patent [19]

Takizawa et al.

[11] Patent Number: 5,121,040

[45] Date of Patent: Jun. 9, 1992

[54] POSITIONING CONTROL APPARATUS

[75] Inventors: Yosichika Takizawa; Yasuyuki Suzuki, both of Aichi, Japan

[73] Assignees: Mitsubishi Denki K.K., Tokyo, Japan; Mitsubishi Denki K.K., Tokyo, Japan

[21] Appl. No.: 558,531

[22] Filed: Jul. 27, 1990

[30] Foreign Application Priority Data

Nov. 10, 1989 [JP] Japan .................................. 1-293008

[51] Int. Cl.⁵ ............................................. G05B 19/23
[52] U.S. Cl. ..................................... 318/574; 318/575; 318/572; 318/569; 318/568.1; 364/474.18
[58] Field of Search ............... 318/574, 575, 572, 567, 318/569, 568.1; 364/474.18

[56] References Cited

U.S. PATENT DOCUMENTS 4,477,754 10/1984 Roch et al. ..................... 318/569 X
4,849,678 7/1989 Kamiguchi ......................... 318/572
4,949,025 8/1990 Iwagaya ............................. 318/569

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A positioning control apparatus comprises a plurality of servo mechanisms corresponding to respective axes, a sequence operation part for successively outputting start commands for the respective servo mechanisms, a positioning operation part for storing a plurality of programs specified in accordance with the start commands and for processing the program in accordance with specified one of the programs to thereby output a positioning control command, and a servo interface for supplying the positioning control command to one of the servo mechanisms to be actuated to start.

5 Claims, 4 Drawing Sheets

POSITIONING CONTROL APPARATUS

BACKGROUND OF THE INVENTION

The present invention relates to a positioning control apparatus for controlling multi-axis positioning operation by servo mechanisms.

FIG. 4 is a block diagram of a conventional positioning control apparatus in which positioning operation is controlled by a sequence controller. In the drawing, the reference numeral 12 designates a sequencer CPU for performing sequence operations such as a positioning operation procedure or the like, and a positioning control unit 13 for performing positioning control in accordance with a command supplied from the sequencer CPU 12. The positioning controller unit 13 is constituted by a positioning operation part 14 and a servo amplifier interface part 15. A servo amplifier 7 connected with a servo motor 8 is connected to the servo amplifier interface part 15.

The sequencer CPU 12 and the positioning controller unit 13 are unitary formed.

The operation of the positioning control apparatus will be described hereunder. The positioning control unit 13 (hereinafter referred to the positioning unit) is arranged to control the servo motor in accordance with the commands produced from the sequencer CPU 12. The contents of the commands are of positioning target position, start, stop, etc. which are defined by a sequence program. The positioning unit 13 operates acceleration/deceleration processing or the like in the positioning operation part 14 in accordance with the commands, and supplies a control signal to the servo amplifier 7 through the servo amplifier interface part 15 (hereinafter referred to the servo amplifier I/F) in accordance with the results of the operation of the positioning operation part 14. The control signal varies depending on the type of the servo amplifier. For example, in the case of the servo amplifier of the pulse input type, the quantity of movement and the speed are controlled by the number and frequency of pulses respectively, and in the case of the servo amplifier of the analog input type, the speed is controlled by the voltage value.

The servo amplifier 7 drives the servo motor 8 in accordance with these control signals. A position detector (not shown) is provided with the servo motor 8 so that it is possible to perform accurate positioning by a feedback signal supplied from the position detector.

In the conventional positioning control apparatus thus constructed, since the sequencer CPU and the positioning operation part unitary formed are provided for every servo motor unit as described above, the conventional positioning control apparatus is disadvantageous in that when the number of axes for controlling positioning is increased and therefore the number of the servo motors is increased, the devices are required correspondingly, resulting in increase in cost. Further, in the case where the type of the servo amplifier is changed and the state of the control signal is therefore changed, for example, from the pulse input type to the analog input type, servo amplifier interfaces matched to the forms of the control signals are provided or the whole of the apparatus including the positioning operation part is exchanged. This is uneconomical.

SUMMARY OF THE INVENTION

The present invention has been attained in order to solve the above problem, and an object thereof is to provide a positioning control apparatus which can perform multi-axis positioning and which can output a control signal in accordance with an input control signal into a servo amplifier.

According to the present invention, the positioning control apparatus comprises a plurality of servo mechanisms corresponding to respective axes; a sequence operation part for successively outputting start commands for the respective servo mechanisms; a positioning operation part for storing a plurality of positioning programs specified in accordance with the start commands and for performing program processing in accordance with specified one of the programs to thereby output a positioning control command; and a servo interface for supplying the positioning control command to one of the servo mechanisms to be actuated to start.

According to the present invention, the positioning operation part is provided with a plurality of positioning programs for calculating and outputting positioning control commands respectively corresponding to the axes or to contents of the positioning controls, so that the positioning programs specified by the start command supplied from the sequence operation part is subjected to processing and the positioning control command which is the result of the processing is supplied to the servo interface corresponding to the servo mechanism specified by the start command. Thus, the positioning control command is supplied to the servo mechanism after it is converted into a predetermined control signal form.

DETAILED DESCRIPTION OF THE PREFERRED EMBODIMENT

Figure 1:
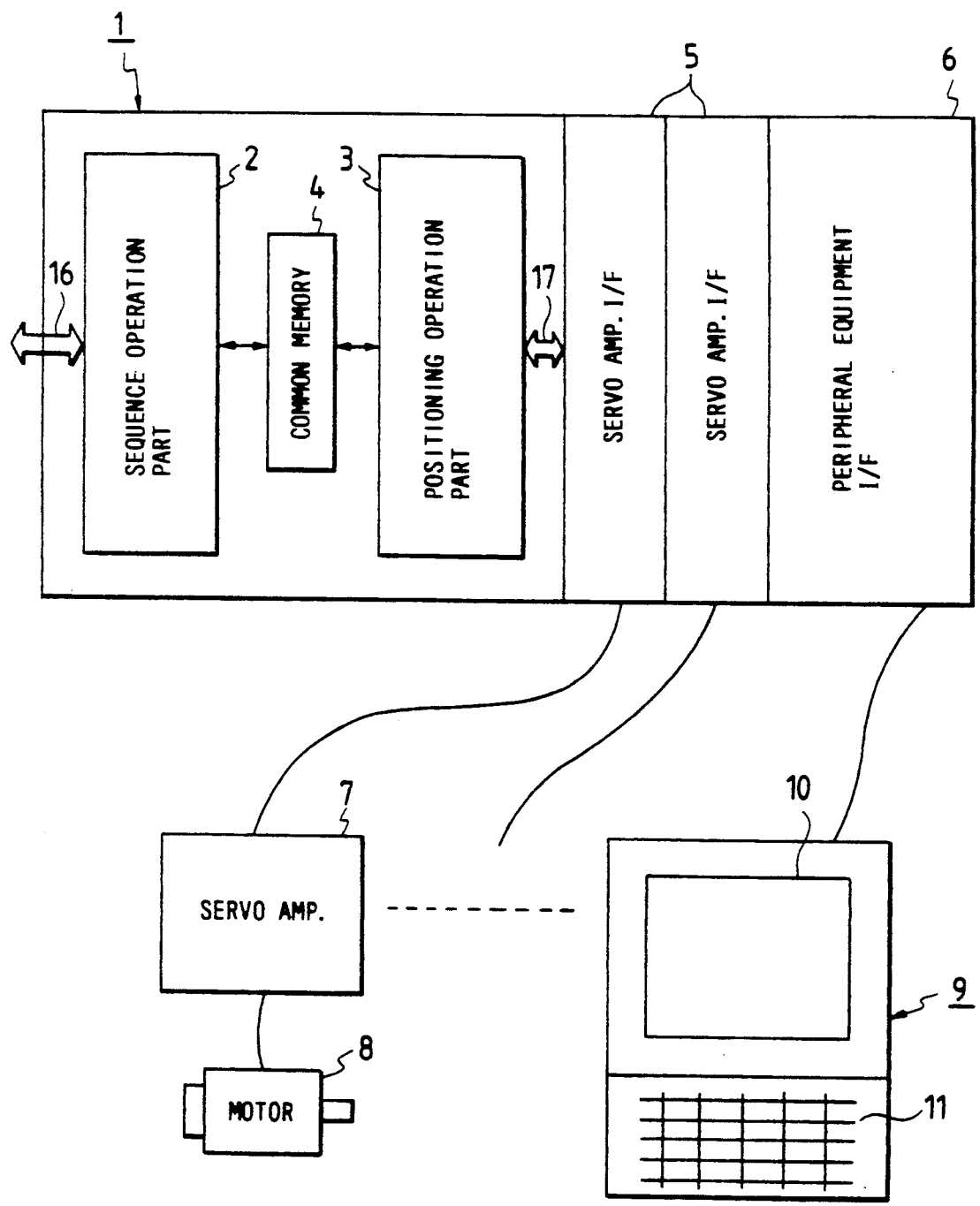
FIG. 1 is a block diagram of an embodiment of the positioning control apparatus according to the present invention.

Referring to the drawings, an embodiment of the positioning control apparatus according to the present invention will be described hereunder. In FIG. 1, the reference numeral 1 designates a sequencer CPU having a positioning function. The sequencer CPU 1 is constituted by a sequence operation part 2 and a positioning operation part 3. Both the operation parts are connected to each other through a common memory 4 for transmitting the information therebetween. The reference numeral 5 designates servo amplifier interface units corresponding in number to the axes to be controlled.

The output control signals of the respective units are different in form from each other depending on the type of servo amplifiers, as already described above with respect to the conventional technique. The reference numeral 6 designates a peripheral equipment interface unit to be connected to a peripheral equipment 9. The peripheral equipment 9 is constituted by a monitor display 10 and a keyboard 11 so that programming and operation monitoring can be performed by the peripheral equipment 9. The peripheral equipment interface is an auxiliary device and is not necessarily required in actual positioning.

The reference numerals 7 and 8 designate a servo amplifier and a servo motor, respectively, which are the same as those in the conventional apparatus.

The reference numeral 16 designates a bus which is led out from the sequence operation part and to which I/O units, positioning control units, etc. (not shown) controlled by the sequence operation part 2 are connected. The reference numeral 17 designates a bus which is led out from the operation part 3 and to which the servo amplifier interfaces 5 and the peripheral equipment interface unit 6 controlled by the positioning operation part 3 are connected.

The operation of the positioning control apparatus will be described hereunder.

A sequence program and a plurality of positioning programs are stored in the sequence operation part 2 and the positioning operation part 3 respectively. Operations independent from one another are individually described in the respective positioning programs and the positioning programs are provided with individual program numbers respectively. When the positioning program is actuated to start in accordance with the sequence program, the actuated positioning program is executed. Only one program is executed. If the programs are actuated to start successively one by one in accordance with the sequence program, a series of positioning operations can be carried out.

Figure 2:
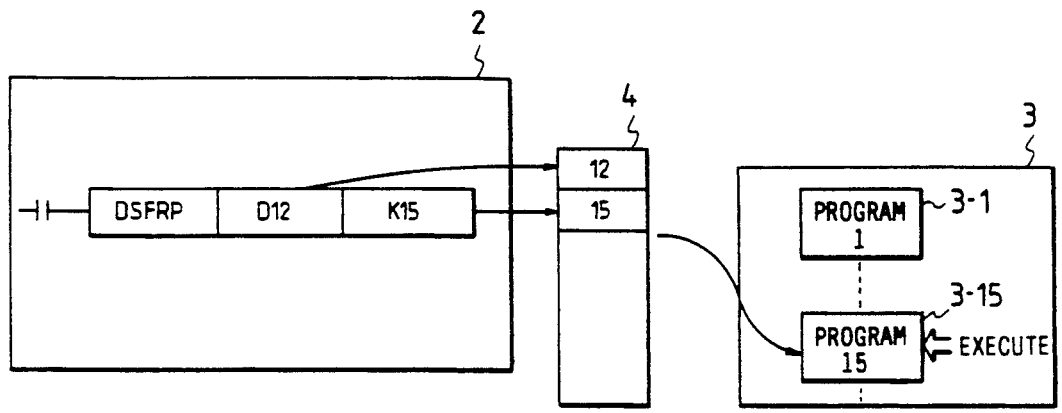
FIG. 2 is a block diagram showing a positioning program starting in the embodiment.

As shown in FIG. 2, the method of starting the positioning program is such that the axis number D12 to be started and the positioning program number K15 to be started are written in the sequence program by the sequence operation part 2 and are stored in the common memory 4. The stored axis number and program number to be started are read out by the operation part 3 in order to transmit the program to be started from the programs in the operation part 3 and a positioning command as a result of program processing to one of the servo amplifier interfaces 5 corresponding to the axis to be started.

The positioning operation part 3 includes a microprocessor and a computing device and has a capability of operation for n axes. The number n varies in a range of from about 2 to 16 depending on the performance of the microprocessor and the computing device and the complexity of the positioning processing. The positioning operation part 3 executes acceleration/deceleration processing, interpolation processing, or the like so as to transfer a target positional address to the servo amplifier interface 5 through the bus 17 every predetermined time. The operation after the servo amplifier interface 5 has received the target positional address (hereinafter referred to as "address") varies depending on the type of the servo amplifier interface 5. Accordingly, the operations are classified into two cases, one being the case where a command is issued in the form of a digital value, the other being the case where a command is issued in the form of a pulse train or a voltage, and description will be made case by case.

First, in the case of issuance of a command in the form of a digital value, the quantity of movement is put out in the form of a numerical value as it is every fixed time. Accordingly, the quantity of movement every fixed time represents a speed and the total of the quantity of movement represents a distance. The servo amplifier supplied with the quantity of movement as a positioning command value rotates the servo motor to the target position.

Figure 5:
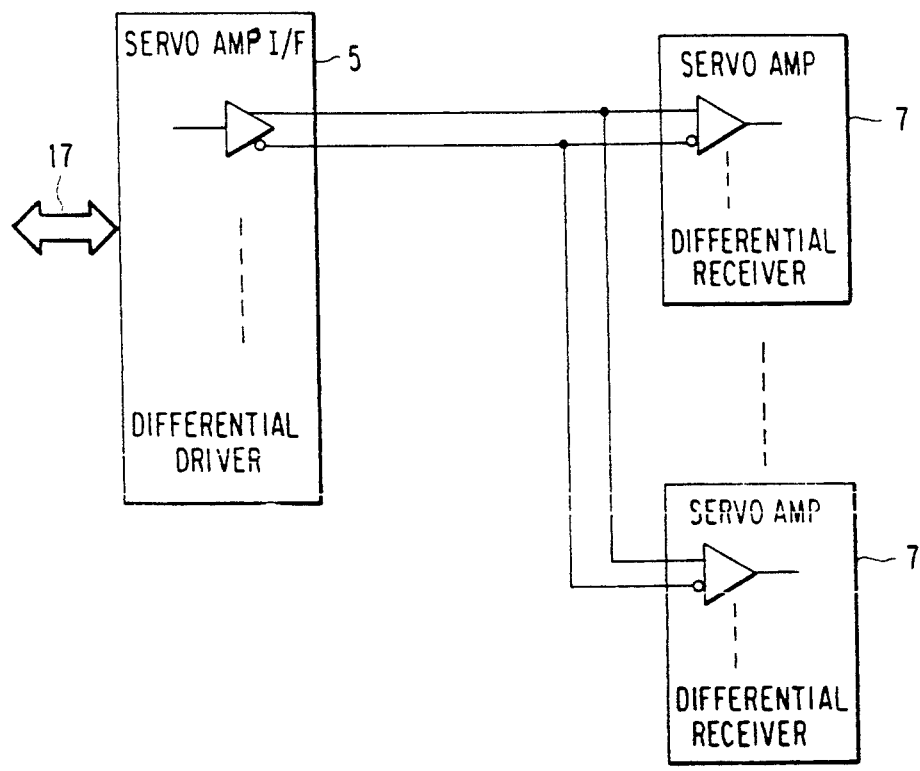

In the case of issuance of a command in the form of a digital value, the servo amplifier interface units 5 and the servo amplifier 7 are connected to each other through a digital bus (parallel or serial), as shown in FIG. 5. Accordingly, the servo amplifier 7 must be an exclusive one which is matched in interface specification with the bus. However, in the case where a plurality of servo amplifier are link-connected to each other, if a multi-drop system is employed for the connection, not only a single servo amplifier interface 5 is required, but the servo amplifier interface 5 can be constituted with a simple and inexpensive configuration by use of only a buffer mainly for transmission because a command is transmitted in the form of a digital value from the positioning operation part to the servo amplifier interface. However, because only an exclusive servo amplifier can be connected, there occurs a case where it is desired to use a partly general-purpose servo amplifier together with the exclusive servo amplifier when the motor capacity is not proper. This requirement in this case can be satisfied by additionally providing only an I/F unit for the general purpose amplifier.

Figure 3A:
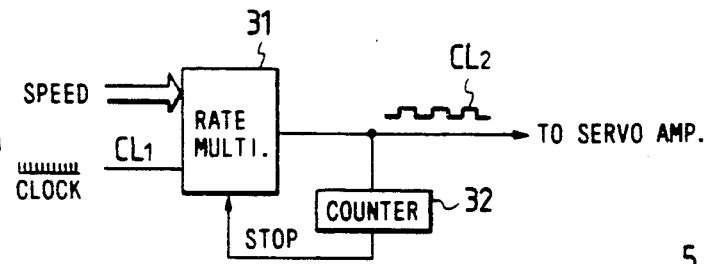
FIG. 3A is a block diagram of a servo amplifier interface in the case where an target position address is put out in the form of a pulse train.

In the case of issuance of a command in the form of a pulse train or a voltage, the servo amplifier interface unit includes therein a circuit for converting the target positional address supplied from the positioning operation part into a pulse train or a voltage. As shown in FIG. 3A, the operation of the circuit for converting the target positioning address into the pulse train is performed such that the speed is calculated from the quantity of movement for every fixed time, the speed is transmitted in a rate multiplier (a dividing circuit) 31, and the rate multiplier 31 divides a clock $CL_1$ of original oscillation by the transmitted value and outputs a divisional clock $CL_2$. A counter 32 counts the number of pulses of the divisional clock $CL_2$ so that the rate multiplier 31 stops outputting pulses when it has put out pulses corresponding to the quantity of movement.

Figure 3B:
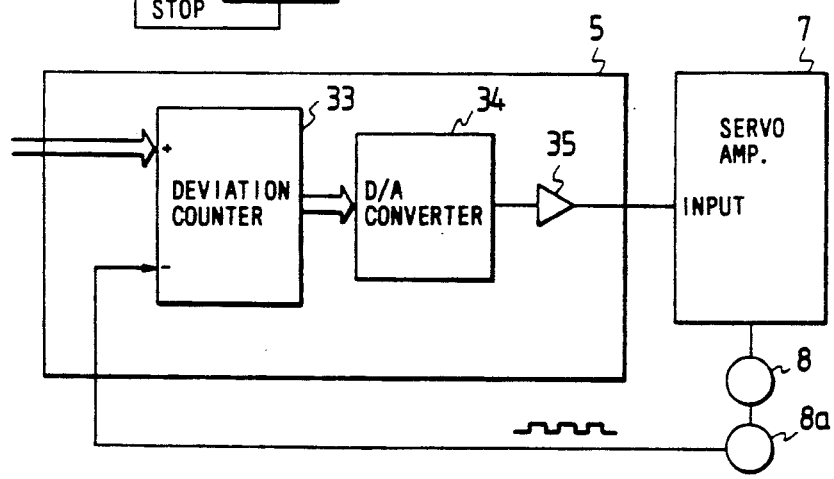
FIG. 3B is a block diagram of the servo amplifier interface in the case where an target-position address is put out in the of a voltage value.
Figure 4:
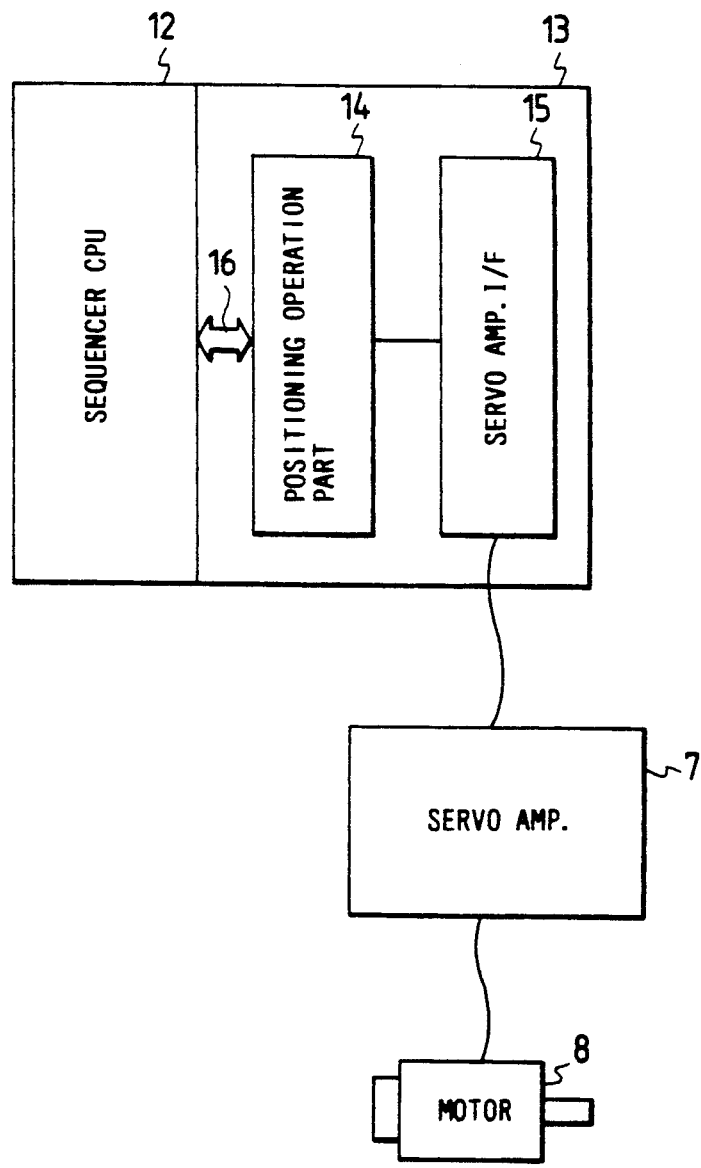
FIG. 4 is a block diagram of a conventional apparatus.

As shown in FIG. 3B, the operation of the circuit for converting the target positional address into a voltage is such that the servo amplifier interface unit 5 includes a deviation counter 33 therein so that the quantity of movement supplied every fixed time from the positioning operation part is added up one by one successively in the counter 33. The output of the counter is D/A converted by a D/A converter 34. The converted analog voltage is amplified by an amplifier 35 so as to be put out as a speed command value for the servo amplifier 7. The higher the voltage value corresponds to higher speed. The servo amplifier 7 rotates the servo motor 8 in accordance with the speed command. At that time, a feedback pulse put out from an encoder 8a attached to the servo motor 8 is subtracted in the deviation counter. When the position command is stopped and the quantity of movement every fixed time becomes zero, the count setting value is reduced by the feedback pulse and at the point of time when the count setting value becomes zero, the voltage value becomes zero, so that the speed of the servo motor 8 becomes zero, that is, the servo motor stops.

With respect to those circuits, one circuit is required for one servo amplifier. In this example, every servo amplifier interface unit has one circuit.

As described above, the positioning operation part is digitally bus-connected with the servo amplifier interface units, so that the same control is performed on every servo amplifier interface unit regardless of the kind thereof. That is, the difference in kind between the servo amplifiers can be absorbed by the servo amplifier interfaces. Accordingly, even if the kind of the servo amplifier is changed, exchange of the sequencer CPU unit 1 in which the positioning operation part is included and change of program are not necessary but suffices it to change only the servo amplifier interface.

Although the servo amplifier I/F units which are the same in number as the axes are provided in this embodiment, the same effect can be obtained even in the case of using only one unit having interfaces for axes.

As described above, according to the present invention, the positioning operating part is arranged to store a plurality of programs for computing positioning commands to be supplied to the servo amplifiers for the respective axes and to selectively start the programs in accordance with the sequence program supplied from the sequence operation part. In a multi-axis system, it is not necessary to provide the positioning operation part for every axis, and therefore the system becomes inexpensive system so much. There is such a further effect that since the servo amplifier interfaces are made independent from the positioning operation part and the servo amplifiers, the change or the like of the servo amplifier can be dealt with exchange of the servo amplifier interface, and therefore it is possible to cope with system change flexibly.

What is claimed is:

1. A position control apparatus for positioning in multi-axis coordinates having a plurality of servo mechanisms corresponding to said multi-axis, said position control apparatus comprising:
   sequence operation means for storing a sequence program and for successively outputting start commands for said respective servo mechanisms;
   a single position operation means for storing a plurality of position programs to be designated in accordance with said start commands and for processing said program in accordance with designated one of said programs to thereby output a position control command; and
   servo interfaces for transmitting said position control command and actuating one of said servo mechanisms.

2. The position control apparatus as claimed in claim 1, wherein said servo interfaces issues said position control command in the form of at least on of a digital value, a pulse train value and a voltage value.

3. The position control apparatus as claimed in claim 2, wherein each of said servo interfaces has a circuit for converting the position control command from the position operation means into at least one of a pulse train value and a voltage value.

4. The position control apparatus as claimed in claim 3, in the case of issuance of the command in the form of the voltage value, wherein said servo interface further has a deviation counter for adding a quantity of movement supplied every fixed time from said single position control means and a digital-to-analog converter.

5. The position control apparatus as claimed in claim 2 further comprising a peripheral equipment interface and a peripheral equipment connected to said peripheral equipment interface, said peripheral equipment including a monitor display for monitoring and a keyboard for programming.

* * * * *